United States Patent [19]

Dimitriou

[11] Patent Number: 4,597,978

[45] Date of Patent: Jul. 1, 1986

[54] METHOD OF CONCENTRATING GRAPE JUICE

[75] Inventor: Michael H. Dimitriou, Bretten, Fed. Rep. of Germany

[73] Assignee: W. Schmidt GmbH & Co. KG, Bretten, Fed. Rep. of Germany

[21] Appl. No.: 686,882

[22] Filed: Dec. 27, 1984

[30] Foreign Application Priority Data

Jan. 25, 1984 [DE] Fed. Rep. of Germany ....... 3402389

[51] Int. Cl.⁴ .......................... A23L 2/08; A23L 2/30
[52] U.S. Cl. .................................. 426/492; 426/495; 426/599
[58] Field of Search ............ 426/490, 492, 495, 330.5, 426/599, 524

[56] References Cited

U.S. PATENT DOCUMENTS 1,767,399  6/1930  Reiling ............................... 426/495

Primary Examiner—George Yeung
Attorney, Agent, or Firm—Spencer & Frank

[57] ABSTRACT

A method of concentrating grape juice to a predetermined final degree of concentration comprises the steps of evaporating one part of the water content of the grape juice to obtain an intermediate degree of concentration less than the final degree of concentration, then stabilizing the grape juice for cream of tartar by cooling the grape juice to near freezing temperature; and thereafter resuming evaporation of water of the grape juice for ultimately reaching the final degree of concentration.

3 Claims, 1 Drawing Figure

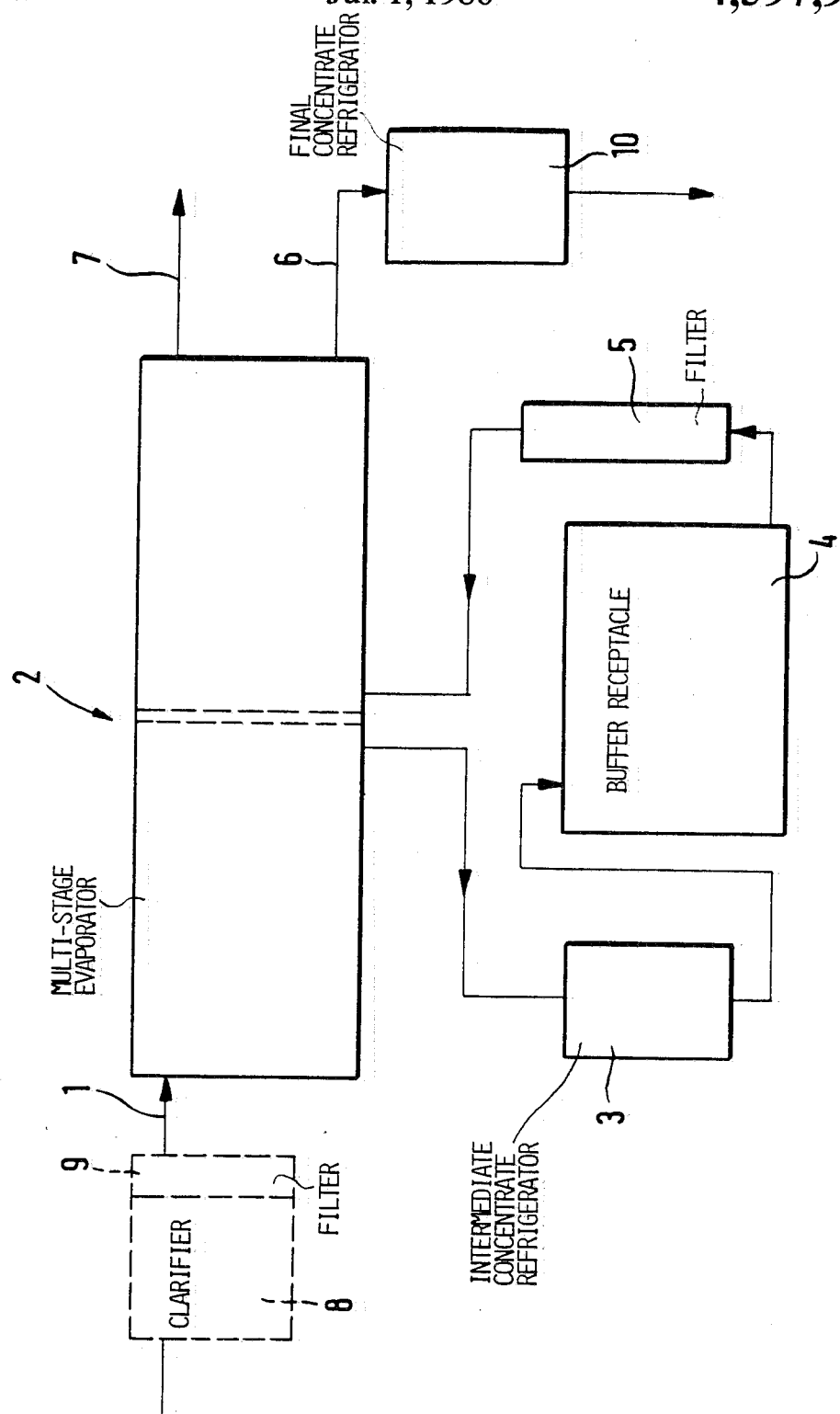

METHOD OF CONCENTRATING GRAPE JUICE

BACKGROUND OF THE INVENTION

This invention relates to a method of concentrating grape juice by evaporating one part of its water content.

For the purpose of concentrating grape juice, the latter is, after being pressed from the grapes, admitted to an evaporator in which its water content is removed to a desired extent by evaporation. The evaporator may be a plate-type, spiral or tubular heat exchanger or evaporator in which the grape juice is heated and concentrated to approximately 50°-72° Brix. This process involves the problem of the formation of potassium bitartrate (cream of tartar) deposits which appear increasingly during grape juice concentration. Cream of tartar deposits cause encrustation and clogging in the evaporator, particularly towards the end of the concentration process, necessitating a frequent opening and cleaning of the apparatus which, in turn, results in a reduced efficiency and increased energy consumption.

It has been attempted to remedy the above drawback by reducing the cream of tartar concentration of the grape juice as much as possible prior to the evaporation process. For this purpose, the grape juice is cooled to approximately 0° C. and then stored for about ten days until the cream of tartar crystals are formed and grow to such an extent that they settle or that they may be separated by appropriate filters. In other processes the crystallization is accelerated by the addition of crystals, also performed at a temperature of approximately 0° C.

According to the above processes, the entire juice quantity obtained as a result of the grape pressing step has to be cooled to approximately 0° C. which means a significant refrigeration input. Further, the relatively long standing period of large juice quantities in a cooled state needs a correspondingly large number of vessels thus requiring a significant machinery input.

It has further been attempted to counteract deposits and clogging particularly in multi-stage evaporators by switching the high-concentrate stage to a previous stage of the evaporator. In this manner, clogging of the evaporator apparatus may be slightly delayed. The required maintenance (cleaning) work has to be performed as before.

In all above-mentioned cream of tartar stabilizing methods which originate in wine making, the concentration of cream of tartar may be lowered to approximately 2 g/l at the most, which corresponds to a saturation degree of the natural grape juice at approximately 0° C. This quantity, however, is still sufficient to cause deposits and clogging in the evaporator, particularly in case of a desired juice concentration of 45°-72° Brix.

The above-discussed problem applies equally to the cooling of the juice concentrate after the completion of the evaporating process, in which case the concentrate refrigerator through which the juice concentrate passes is also exposed to clogging by cream of tartar and, accordingly, has to be frequently cleaned.

SUMMARY OF THE INVENTION

It is an object of the invention to provide an improved method of making grape juice concentrate which eliminates the risks of clogging the evaporator by cream of tartar, and as a result of which the evaporator may operate without interruptions and without the need of switching between the different evaporation stages and further, the individual evaporation stages need not be cleaned and also, the unconcentrated (entire) grape juice quantity does not have to be cooled and submitted to intermediate storing.

This object and others to become apparent as the specification progresses, are accomplished by the invention, according to which, briefly stated, during the evaporation process the grape juice is stabilized for cream of tartar, while the evaporation process is interrupted prior to completion and the grape juice is cooled close to the freezing point. The cream of tartar stabilizing processes may be conventional and thus may be those discussed earlier.

Thus, according to the invention, the grape juice is concentrated to a certain degree, for example, between 25° and 35° Brix. where encrustations in the evaporator do not yet appear. If now the partially concentrated grape juice is cooled to approximately 0° C., a relatively high proportion of cream of tartar may precipitate and may be filtered out because of its decrease of solubility at higher concentrations, so that for a resumed evaporation a juice concentrate is available which, for completing the concentration of the grape juice does not risk an encrustation of the evaporator with cream of tartar. Further, the intermediate cooling of the partially concentrated juice requires a reduced refrigerating output. Similar considerations apply to the containers or their capacity for the intermediate storage. It is further of advantage that by means of the initial concentration cream of tartar crystals are formed which serve as seeds for the further cream of tartar formation after cooling. In this manner the cream of tartar formation is accelerated, whereby the required time period for the intermediate storage is shortened.

The colloids contained in the natural grape juice may, to an undesired extent, hinder the formation of the cream of tartar crystals. Therefore, as a further feature of the invention, prior to the beginning of the evaporation process, the grape juice is advantageously clarified and then filtered. By means of the filtering step, the clarification slurry is removed and during the subsequent evaporation process an unhindered formation of cream of tartar crystals may take place.

According to the invention a stabilization of cream of tartar is carried out when the evaporation process is 20-70%, preferably 40-60% complete to obtain, dependent upon the particular properties of the grape juice, a satisfactory result in accordance with the objectives of the invention. It is, however, in all cases expedient to effect the stabilization of cream of tartar by cooling the partially concentrated grape juice as late as possible, because in this manner the degree of efficiency of the cream of tartar stabilization and the necessary machinery and energy input may be maintained at the lowest possible level.

The method according to the invention further has the advantage that clogging problems are also eliminated in a concentrate refrigerator coupled downstream of the evaporator and thus, in particular, a periodic cleaning of such refrigerator is no longer necessary.

BRIEF DESCRIPTION OF THE DRAWING

The sole FIGURE illustrates a flow diagram of a preferred embodiment of the invention.

DESCRIPTION OF THE PREFERRED EMBODIMENT

Turning now to the FIGURE, the grape juice 1, after having passed through an optional clarifying stage 8 having an after-connected filter 9, is admitted to an evaporator 2 which has a plurality of the stages in which the grape juice is heated and, by evaporation, one part of its water content is removed. The partially concentrated grape juice is, approximately in the middle of the evaporation line, removed and admitted to a refrigerator 3 in which it is cooled to approximately 0° C. The cooled and partially concentrated juice is introduced into a buffer receptacle 4 which functions as an intermediate storage where cream of tartar stabilization, that is, the formation of cream of tartar takes place. The thus-stabilized juice is, subsequent to the separation of the cream of tartar crystals (by sedimentation or by means of a filter 5), reintroduced into the evaporator 2 for resuming evaporation where, by means of renewed heat application, a further concentration of the grape juice takes place. Thereafter, the grape juice leaves the evaporator 2 at 6 in the desired concentrated state (predetermined final degree of condensation) while vapors leave the condensator of the evaporator 2 as condensate through the outlet 7. From the evaporator 2 the juice concentrate is introduced into a concentrate refrigerator 10 in which it is cooled to a temperature slightly above 0° C.

It will be understood that the above description of the present invention is susceptible to various modifications, changes and adaptations, and the same are intended to be comprehended within the meaning and range of equivalents of the appended claims.

What is claimed is:

1. A method of concentrating grape juice, containing cream of tartar, to a predetermined final degree of concentration, comprising the following steps:
    (a) evaporating one part of the water content of the grape juice to obtain an intermediate degree of concentration which is 40% to 70% of said final degree of concentration;
    (b) subsequent to step (a), stabilizing the grape juice for cream of tartar; said stabilizing step including the step of cooling the grape juice to near freezing temperature and separating cream of tartar from the cooled, partially concentrated grape juice; and
    (c) subsequent to step (b), resuming evaporation of water of said grape juice for ultimately reaching said final degree of concentration.

2. A method as defined in claim 1, wherein said intermediate degree of concentration is about 50% of said final degree of concentration.

3. A method as defined in claim 1, further comprising the steps of clarifying and subsequently filtering the grape juice prior to step (a).

* * * * *